US009427908B2

(12) United States Patent
Low et al.

(10) Patent No.: US 9,427,908 B2
(45) Date of Patent: *Aug. 30, 2016

(54) MODIFICATION OF SURFACE WETTING PROPERTIES OF A SUBSTRATE

(75) Inventors: Hong Yee Low, Singapore (SG); Fengxiang Zhang, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 507 days.

This patent is subject to a terminal disclaimer.

(21) Appl. No.: 12/447,416

(22) PCT Filed: Oct. 10, 2007

(86) PCT No.: PCT/SG2007/000344
§ 371 (c)(1),
(2), (4) Date: Jan. 28, 2010

(87) PCT Pub. No.: WO2008/051166
PCT Pub. Date: May 2, 2008

(65) Prior Publication Data
US 2010/0129608 A1   May 27, 2010

Related U.S. Application Data

(60) Provisional application No. 60/854,611, filed on Oct. 25, 2006.

(51) Int. Cl.
*B29C 59/02* (2006.01)
*B05D 3/12* (2006.01)
*B05D 5/00* (2006.01)
(Continued)

(52) U.S. Cl.
CPC ............... *B29C 59/022* (2013.01); *B05D 3/12*
(2013.01); *B05D 5/00* (2013.01); *B05D 5/08*
(2013.01); *B05D 7/04* (2013.01); *B29C 59/02*
(2013.01); *B29C 2059/023* (2013.01); *Y10T 428/24479* (2015.01)

(58) Field of Classification Search
CPC .............................. B29C 59/02; B29C 59/022
See application file for complete search history.

(56) References Cited

U.S. PATENT DOCUMENTS 3,354,022 A * 11/1967 Johnson, Jr et al. ......... 428/167
5,772,905 A * 6/1998 Chou .............................. 216/44
6,660,363 B1 12/2003 Barthlott
(Continued)

FOREIGN PATENT DOCUMENTS

JP   2005297545   10/2005
WO   0065408      11/2000
(Continued)

OTHER PUBLICATIONS

X.-M. Zhao, Y. Xia, G.M. Whitesides, Fabrication of Three-Dimensional Micro-Structures: Microtransfer Molding, Advanced Materials, vol. 8, No. 10 (1996), pp. 837-840.*
(Continued)

*Primary Examiner* — Jeremiah Smith
(74) *Attorney, Agent, or Firm* — Fish & Richardson P.C.

(57) ABSTRACT

A method of modifying the wetting properties of the surface of a substrate, the method comprising the step of applying a first mold having an imprint forming surface to said substrate to form a first imprint thereon, said imprint forming surface being chosen to modify the wetting properties of the substrate surface.

16 Claims, 6 Drawing Sheets

(51) Int. Cl.
*B05D 5/08* (2006.01)
*B05D 7/04* (2006.01)

(56) References Cited

U.S. PATENT DOCUMENTS

| | | | |
|---|---|---|---|
| 6,749,791 | B1 | 6/2004 | Schulte et al. |
| 7,041,604 | B2 | 5/2006 | Miller et al. |
| 8,636,937 | B2* | 1/2014 | Zhang et al. ............ 264/294 |
| 2002/0084553 | A1 | 7/2002 | Nun et al. |
| 2005/0003146 | A1 | 1/2005 | Spath |
| 2005/0074697 | A1* | 4/2005 | De Vittorio et al. ......... 430/311 |
| 2005/0159019 | A1 | 7/2005 | Lee |
| 2005/0258570 | A1 | 11/2005 | Kong et al. |
| 2006/0097361 | A1* | 5/2006 | Tanaka et al. ............ 257/643 |
| 2007/0059497 | A1* | 3/2007 | Huang et al. ............ 428/195.1 |
| 2007/0121375 | A1* | 5/2007 | Sewell ............ 365/171 |
| 2008/0023880 | A1 | 1/2008 | Imada et al. |
| 2009/0274579 | A1* | 11/2009 | Orwar et al. ............ 422/99 |
| 2010/0078854 | A1* | 4/2010 | Berggren et al. ............ 264/293 |
| 2010/0129608 | A1* | 5/2010 | Low et al. ............ 428/156 |

FOREIGN PATENT DOCUMENTS

| | | | |
|---|---|---|---|
| WO | 03031096 | 4/2003 | |
| WO | WO 03/096123 * | 11/2003 | ............ G03F 7/00 |
| WO | WO 2004/048064 * | 6/2004 | ............ B29C 41/12 |
| WO | 2006057843 | 1/2006 | |
| WO | 2006031197 | 3/2006 | |
| WO | 2007046772 | 4/2007 | |

OTHER PUBLICATIONS

Gleiche—Gleiche, M., Chi, L. F. & Fuchs, H. Nanoscopic channel lattices with controlled anisotropic wetting. Nature 403, 173 (2000).*

* cited by examiner

MODIFICATION OF SURFACE WETTING PROPERTIES OF A SUBSTRATE

TECHNICAL FIELD

The present invention generally relates to a method for modifying the wetting properties of the surface of a substrate, such as a polymer substrate.

BACKGROUND

Wetting properties of a surface of a material are dependent on the chemical composition or geometrical structures of the material surface. Generally, the surface wetting properties of a material can be determined by measuring the contact angle of a liquid droplet on the surface. When water is used, a small contact angle (ie less than 90°) is indicative of a hydrophilic surface while a large contact angle (ie more than 90°) is indicative of a hydrophobic, surface. For example, a hydrophilic surface such as glass exhibits a contact angle with water in the range of 5° to 25° while poly(dimethylsiloxane) exhibits a contact angle of 109° and is hydrophobic.

By measuring the contact angle from different directions, the isotropic or anisotropic properties of surface wetting can be determined. If the contact angles are the same when measured from different directions, the wetting property is isotropic. If the contact angles are different when measured from different directions, the wetting property is anisotropic.

Scientists and engineers have developed various methods to tailor the surface wetting properties of a material by altering the contact angle. By mimicking structures found in nature, certain desired wetting properties can be achieved. For example, the surfaces of lotus leaves are superhydrophobic due to the presence of micro/nanoscale hierarchical structures which allow water droplets to roll off easily, taking dirt and contaminants with them, leading to a self-cleaning effect. Such an effect is desirable in paints, roof tiles, fabrics or any other surfaces where self-cleaning is needed.

Generally, surface wetting properties are modified either through chemical or physical means. Roughening a surface can greatly enhance the hydrophobicity or hydrophilicity of the surface.

Some chemical surface wetting modification methods include fluorination, formation of pores or adhesion of organic films to inorganic substrates. However, these methods may result in detrimental changes to the material, such as the material's mechanical integrity. Additionally, changes in the surface wetting properties may not be permanent.

On the other hand, physical means include plasma-enhanced chemical vapour deposition, ion-beam etching, microcontact printing and photolithography. However, complicated equipments are often required and led to unnecessary restriction of sample sizes.

When roughening a surface results in anisotropic patterns or roughness geometry, a liquid droplet shows a non-spherical shape when placed on such surfaces. The apparent contact angles of the droplet observed in directions perpendicular and parallel to the droplet are different, resulting in anisotropic wetting or de-wetting. Anisotropic wetting had been observed on chemically patterned liquidphilic surfaces and micropatterned monolayer surfaces with alternating liquidphilic/liquidphobic area prepared by vacuum ultraviolet photolithography. Anisotropic wetting properties have also been demonstrated on the surface of rice leaves leading to the replication of the rice leaf structure by growing aligned carbon nanotubes. However, efforts to tune the degree of anisotropic wetting have been met with limited success.

There is a need to provide a method to alter the surface wetting properties of a substrate that overcomes or at least ameliorates one or more of the disadvantages described above.

SUMMARY

According to a first aspect, there is provided a method of modifying the wetting properties of the surface of a substrate, the method comprising the step of:

(A) applying a first mold having an imprint forming surface to said substrate to form a first imprint thereon, said imprint forming surface being chosen to modify the wetting properties of the substrate surface.

Advantageously, the method modifies the wetting properties of the surface of the substrate while optionally excluding chemically treatment of said surface.

Advantageously, the method may modify the wetting properties of the surface of the substrate while not affecting at least one of the thermal, chemical and optical properties of the substrate.

According to a second aspect, there is provided a method of modifying the wetting properties of the surface of a polymer substrate, the method comprising the steps of:

(A) applying a first mold having an imprint forming surface to said polymer substrate to form a first imprint) thereon;

(B) applying a second mold having an imprint forming surface to said first imprint to form a second imprint on said first imprint; and (C) orienting, during said applying step (B), said second mold relative to said first imprint, wherein said orienting and said first and second imprint dimensions are selected to modify the wetting properties of the polymer substrate surface.

According to a third aspect, there is provided a substrate having a surface with a selected wetting property, the substrate being made in a method comprising the step of:

(A) applying a first mold having an imprint forming surface to said substrate to form a first imprint thereon, said imprint forming surface being chosen to modify the wetting properties of the substrate surface.

In one embodiment, there is provided a polymer substrate having a surface with a selected wetting property, the polymer substrate being made in a method comprising the steps of:

(A) applying a first mold having an imprint forming surface to said polymer substrate to form a first imprint) thereon;

(B) applying a second mold having an imprint forming surface to said first imprint to form a second imprint on said first imprint; and (C) orienting, during said applying step (b), said second mold relative to said first imprint, wherein said orienting and said first and second imprint dimensions are selected to obtain the selected vetting properties of the surface of the polymer substrate.

According to a fourth aspect, there is provided a three-dimensional polymeric structure made in a method as defined in the first aspect.

DEFINITIONS

The following words and terms used herein shall have the meaning indicated:

The term "wetting property" when applied to a surface is to be interpreted broadly to include any property of a surface that allows or disallows the spreading of a test liquid droplet on the surface. This spreading of a test liquid droplet depends on the roughness and surface energy. Wetting property of a surface can be determined by measuring the contact angle between the liquid droplet and the solid surface. Depending on the values of the contact angles and the directions of measurement, isotropic or anisotropic wetting property of a surface can be interpreted as liquidphobic or liquidphilic. Generally, the spreading and hence wetting behaviour of a liquid droplet can be modeled according to the Wenzel equation (see *"Resistance of Solid Surfaces to Wetting by Water"* by R. N. Wenzel, *Industrial and Engineering Chemistry,* 1936, 28(8), page 988)) or the Cassie equation) (see "Contact Angle" by A. B. D. Cassie, *Discussions of the Faraday Society,* 1948, 3, page 11). However, in some cases, the behaviour may be modeled according to a modified form(s) of the equation (s), which are known to those skilled in the art.

The term "contact angle", in the context of this specification, is to be interpreted-broadly to include any angle that is measured between a liquid/solid interface. The contact angle is system specific and depends on the interfacial surface tension of the liquid/solid interface. A discussion on contact angle and its relation to surface wetting properties can be seen from *"Wettability, Spreading,* and *Interfacial Phenomena in High-Temperature Coatings"* by R. Asthana and N. Sobczak, JOM-e, 2000, 52 (1). The contact angle can be measured from two directions. In the context of this specification, for a longitudinal imprint being disposed about a longitudinal axis, $\theta x$ refers to the contact angle measured in the "X" direction being perpendicular to the longitudinal axis and $\theta y$ refers to the contact angle measured in the "Y" direction parallel, or in alignment with, the longitudinal axis. The value of the contact angle, $\theta x$ or $\theta y$, may indicate the liquidphobicity or liquidphilicity of a surface. The difference of these two contact angles, represented by $\Delta \theta$ (where $\Delta \theta = \theta y - \theta x$), indicates the degree of isotropy or anisotropy of a wetting property.

The term "roughness" in the context of this disclosure, when referring to a surface is to be interpreted broadly to include any surface that has irregular or uneven textures or structures so that there is a degree of heterogeneity on the surface.

The term "smooth" or "bare" in the context of this disclosure, when referring to a surface is to be interpreted broadly to include any surface that is substantially homogeneous due to the absence of treatments, whether chemical or physical, to induce a change in the texture or height of the surface.

The terms "liquidphobic" and "liquidphobicity" when referring to a surface are to be interpreted broadly to include any property of a surface that does not cause a liquid droplet to substantially spread across it. Generally, if the contact angle between a liquid droplet and the surface is greater than 90°, the surface is liquidphobic or exhibits liquidphobicity. Likewise, the terms "hydrophobic" and "hydrophobicity" mean that the surface is liquidphobic or exhibits liquidphobicity when water is the liquid placed thereon. If the contact angle between a water droplet and the surface is greater than 150°, the surface is defined as superhydrophobic.

The terms "liquidphilic" or "liquidphilicity" when referring to a surface are to be interpreted broadly to include any property of a surface that causes a liquid droplet to substantially spread across it. Generally, if the contact angle between a liquid droplet and the surface is smaller than 90°, the surface is liquidphilic. Likewise, the terms "hydrophilic" and "hydrophilicity" mean that the surface is liquidphilic or exhibits liquidphilicity when water is the liquid placed thereon. If the contact angle between a water droplet and the surface is about 0°, the surface is defined as superhydrophilic.

The terms "isotropic" or "isotropy" when referring to a wetting property means that a liquid droplet has similar values of apparent contact angles when measured from different directions. Generally, the contact angles are measured from two directions, wherein the two directions are perpendicular to each other (ie X direction and Y direction for a longitudinal axis for a longitudinal imprint as defined above). The smaller the difference between the two contact angle values, the greater the degree of isotropy.

The terms "anisotropic" or "anisotropy" when referring to a wetting property means that a liquid droplet has different values of apparent contact angles when measured from different directions. Generally, the contact angles are measured from two directions (ie X direction and Y direction for a longitudinal axis for a longitudinal imprint as defined above), wherein the two directions are perpendicular to each other. The greater the difference between the two contact angle values, the greater the degree of anisotropy.

The term "nanoimprinting lithography" is to be interpreted broadly to include any method for printing or creating a pattern or structure on the micro/nanoscale on the surface of a substrate by applying a mold with the defined pattern or structure on the surface at certain temperatures and pressures. A method of nanoimprinting lithography, can be referred from U.S. Pat. No. 5,772,905.

The term "microscale" is to be interpreted to include any dimensions that are in the range of about 1 (μm) to about 100 μm. The term "microstructures" as used herein, refers to structures comprising "microscale" features.

The term "nanoscale" is to be interpreted to include any dimensions that are below about 1 μm. The term "nanostructures" as used herein, are structures comprising "nanoscale" or "submicron" features.

The term "three dimensional" is to be interpreted broadly to include any structures, structural features, imprints or patterns that have both lateral variations (thickness) as well as variations with depth.

The term "hierarchical" is to be interpreted broadly to include any relevant steps that are carried out in a serial manner. For example, the term "hierarchical nanoimprinting" refers to the sequential application of nano-sized imprints on a surface of a polymer substrate. In one embodiment, hierarchical nanoimprinting is carried out using two molds that are applied to the surface of the substrate separately one, after the other. In other embodiments, more than two molds can be used to create a complex hierarchical structure. Typically, the subsequent imprints have smaller dimensions when compared to the preceding imprint so that the hierarchical structure exhibits a variation in size along the height of the imprint, that is, along the z-direction.

The term "glass transition temperature" ($T_g$) is to be interpreted to include any temperature of a polymer at which the polymer lies between the rubbery and glass states. This means that above the $T_g$, the polymer becomes rubbery and can undergo elastic or plastic deformation without fracture. Above this temperature, such polymers can be induced to flow under pressure. When the temperature of the polymer falls below the $T_g$, generally, the polymer will become inflexible and brittle such that it will break when a stress is applied to the polymer. It should be noted that the $T_g$ is not a sharp transition temperature but a gradual transition and is subject to some variation depending on the experimental conditions (e.g., film thickness, tacticity of the polymer, etc.). The actual $T_g$ of a polymer film will vary as a function of film thickness. The $T_g$ will be defined herein as being the bulk glass-transition temperature of the polymer substrate. The bulk glass transition temperature is a specific value that is widely agreed upon in the literature. Glass transition temperature values of polymers may be obtained from *PPP Handbook*™ software edited by Dr D. T. Wu, 2000.

The term "energy barrier" in the context of this disclosure, is to be interpreted as the minimum amount of energy required for a stationary liquid droplet disposed on a surface to move in a particular direction. A more thorough discussion on energy barrier can be obtained from "*Ultrahydrophobic Polymer Surfaces Prepared by Simultaneous Ablation of Polypropylene and Sputtering of Poly(tetrafluoroethylene) Using Radio frequency Plasma*" by J. P. Youngblood and T. J. McCarthy, *Macromolecules*, 32 (20), 1999, pages 6800 to 6806.

The term "plasma treatment" is to be interpreted broadly to include any exposure of a surface to plasma such that organic contaminants on the surface are at least partially destroyed. Generally, such plasma is a low-pressure oxidative plasma such as oxygen ($O_2$), argon, and mixtures of oxygen and argon, generated with a radio frequency (RF) or microwave source.

Unless specified otherwise, the terms "comprising" and "comprise", and grammatical variants thereof, are intended to represent "open" or "inclusive" language such that they include recited elements but also permit inclusion of additional, unrecited elements.

As used herein, the term "about", in the context of concentrations of components of the formulations, typically means +/−0.5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

DISCLOSURE OF OPTIONAL EMBODIMENTS

Exemplary, non-limiting embodiments of a method of modifying the wetting properties of the surface of a substrate will now be disclosed. The method comprises the step of applying a first mold having an imprint forming surface to the substrate to form a first imprint thereon, said imprint forming surface being chosen to modify the wetting properties of the substrate surface.

Advantageously, the method modifies the wetting properties of the surface of the substrate while optionally excluding chemically treatment of the surface.

In one embodiment, the substrate is a polymer substrate although any material that is capable of being imprinted by a mold can be used. For example, in other embodiments, the substrate may be silicon or silicon based materials such as glass. In another embodiment, the substrate may be Gallium (III) arsenide. In a further embodiment, the substrate may be sapphire.

Advantageously, the method comprises the step of selecting a thermoplastic polymer as the polymer substrate. In one embodiment, the method comprises the step of selecting the monomers to form the thermoplastic polymer from the group consisting of acrylates, phthalamides, acrylonitriles, cellulosics, styrenes, alkyls, alkyls methacrylates, alkenes, halogenated alkenes, amides, imides, aryletherketones, butadienes, ketones, esters, acetals, carbonates and combinations thereof. In one embodiment, the thermoplastic polymer is at least one of a polystyrene, a polymethyl methacrylate and a polycarbonate. Exemplary monomers to form the thermoplastic polymer may be selected from the group consisting of methyls, ethylenes, propylenes, methyl methacrylates, methylpentenes, vinylidene, vinylidene chloride, etherimides, ethylenechiorinates, urethanes, ethylene vinyl alcohols, fluoroplastics, carbonates, acrylonitrile-butadiene-styrenes, etheretherketones, ionomers, butylenes, phenylene oxides, sulphones; ethersulphones, phenylene sulphides, elastomers, ethylene terephthalate, naphthalene terephthalate, ethylene naphthalene and combinations thereof.

In another embodiment, the polymer substrate may be a photoresist material. Suitable photoresist materials include epoxy based negative resists such as SU-8™ resist available from MicroChem. Corp. of Newton, Mass., United States of America.

The polymer substrate may be a polymer composite whereby particles may be added to or incorporated with the polymer. These particles may be selected from the group consisting of calcium carbonate, carbon filler, glass filler, fibers, glass fibers, carbon fibers, carbon nanotubes and mixtures thereof.

The method may further comprise the steps of applying a second mold having an imprint forming surface to the first imprint to form a second imprint on said first imprint; and orienting, during the step of applying a second mold, the second mold relative to the first imprint, wherein the orienting step and the first and second imprint dimensions are selected to modify the wetting properties of the substrate surface.

In one embodiment, the orienting step renders the substrate surface more liquidphobic or more liquidphilic relative to a surface not having the first and second molds applied thereon. The orienting step may also adjust the isotropic properties of the substrate. Accordingly, depending on the orientation of the first imprint relative to the second imprint, the isotropic properties can be adjusted. For example, a hydrophilic polymer surface, such as polymethyl methacrylate (PMMA), may be rendered more hydrophobic after imprinting two imprints on the polymer surface and more anisotropic. A hydrophobic polymer surface, such as polystyrene (PS), may be rendered even more hydrophobic after imprinting two imprints on the polymer surface and more anisotropic.

The first and second molds may have a defined surface to form a plurality of the first and second imprints on the substrate surface. The plurality of the first and second imprints form respective gratings on the substrate surface consisting of a series of alternating trenches disposed between each grating. The first and second imprints may be generally longitudinal in shape, each of the imprints extending about a longitudinal axis.

During the orienting step, the second mold may be applied to the first imprint such that the longitudinal axes of the formed second imprints are disposed at an angle, relative to the longitudinal axes of the formed first imprints, in the range selected from the group consisting of about 0° to about 90° about 0° to about 45° and about 45° to about 90°. In one embodiment, the longitudinal axis of the second mold is generally parallel relative to the longitudinal axis of the first imprint. In another embodiment, the longitudinal axis of the second mold is generally perpendicular relative to the longitudinal axis of the first imprint. In a further embodiment, the longitudinal axis of the second mold is about 45° relative to the longitudinal axis of the first imprint.

In another embodiment, the widths of the first and second imprints are in either the microscale or the nanoscale. The width of the first and second imprints may be in the range selected from the group consisting of about 200 nm to about 3000 nm, about 250 nm to about 2500 nm and about 250 nm to about 2000 nm. The first and second imprints may have different width dimensions.

By varying the orientation between the two imprinting steps and controlling the imprinting conditions in the secondary imprint, a variety of sophisticated hierarchical structures may be obtained. The dimensions of the patterns on the first mold may be larger than, similar to, or smaller than the dimensions of the patterns on the second mold. The patterns on the first mold may be similar to or may be different from the patterns on the second mold. The patterns may comprise a series of gratings disposed between a pair of trenches to form respective series of trenches disposed between a pair of gratings on the surface of the substrate. The gratings and trenches may be parallel to each other.

Using different dimensions of the second mold for the secondary imprint at different orientations to the first imprint may result in desired changes to contact angles and wetting properties over a wide range so that wetting properties for a surface of a substrate may be customized.

The first and second molds may have a defined surface to create three-dimensional structures during at least one of the first and second applying steps. The three-dimensional structures may comprise at least one of microstructures, nanostructures and combinations thereof.

The method may comprise the step of selecting at least one of the first mold and the second mold from the group consisting of silicon, metal, glass, quartz, ceramic and combinations thereof.

The method may comprise, before the step of applying a first mold or a second mold, the step of treating at least one of the first and second molds with an anti-stiction agent. The anti-stiction agent is a silane-based anti-stiction agent.

In one embodiment, during the step of applying a first imprint, the method may comprise the step of selecting a temperature that is above the glass transition temperature (Tg) of the polymer substrate. At this temperature, the polymer softens and may conform to the shape of the first mold such that an imprint is created on the surface of the polymer whereby the pattern of the imprint may be complementary to the pattern on the first mold when the polymer is cooled and subsequently hardens. For example, if the first mold has gratings and trenches, when it is applied onto a surface of a polymer substrate, the gratings on the first mold may result in corresponding trenches on the polymer substrate and the trenches on the first mold may result in corresponding gratings on the polymer substrate. Furthermore, the mold may be applied preferably at a predetermined pressure for a certain period of time to form an imprint on the surface of the polymer substrate. The temperature and pressure to be applied will be dependent on the polymer used.

In one embodiment, during the step of applying a second imprint, the method may comprise the step of selecting a temperature that is below the glass transition temperature (Tg) of the polymer substrate.

In one embodiment, the method may comprise, after applying a second imprint, the step of forming one or more further imprints on the second imprint, wherein the one or more further imprints are at a different orientation to at least the second imprint.

Importantly, the method may allow for the possibility to tune the degree of anisotropic wetting properties of a substrate surface such that the flow of liquids in a desired direction may be, achieved. In embodiments where the imprints are gratings and trenches, the liquid may flow along the micro/nano-scale grooves on the polymer surface created by the various orientations and dimensions of the first and secondary imprints. The gratings and trenches change the shape of a liquid droplet such that it may become elongated. The elongated shape of the liquid droplet accounts for the changes in the anisotropic wetting. Generally, a liquid droplet has good wettability along a longitudinal axis of a trench and has poor wettability along a direction perpendicular to the longitudinal axis of the trench.

The method may comprise the use of nanoimprinting lithography. The method may result in changing the texture or three-dimensional structure of a surface of a substrate.

The method may result in a roughening of a surface of a substrate.

The molds may be made of any suitable material that is chemically inert and may be harder than the softened substrate when used at the respective temperature. The molds may be made of silicon, metal, glass, quartz, ceramic or combinations thereof.

The molds may be patterned such that some patterns may protrude from the surface of the mold. The patterns may comprise holes, columns, gratings or trenches. The patterns may have defined heights and widths in the micro/nanoscale. The patterns may be spaced apart from each other. The pattern may comprise gratings and trenches. The gratings and trenches may be placed parallel to each other.

The temperature used when applying a first mold to a surface of a polymer substrate may be selected from the group consisting of about 120° C. to about 200° C., about 140° C. to about 200° C., about 160° C. to about 200° C., about 180° C. to about 200° C., about 120° C. to about 140° C., about 120° C. to about 160° C. and about 120° C. to about 180° C.

The pressure used when applying a first mold to a surface of a polymer substrate may be selected from the group consisting of about 40 bars to about 50 bars, about 42 bars to about 50 bars, about 44 bars to about 50 bars, about 46 bars to about 50 bars, about 48 bars to about 50 bars, about 40 bars to about 42 bars, about 40 bars to about 44 bars, about 40 bars to about 46 bars and about 40 bars to about 48 bars.

The time period used when applying a first mold to a surface of a polymer substrate may be in the range of about 4 minutes to 20 minutes. For substrates of polycarbonate (PC), polystyrene (PS) and relatively low molecular-weight polymethylmethacrylate (PMMA) (ie Mw≥about 15,000 g/mol), 5-10 minutes was used when applying the first mold to substrate surface. For higher molecular-weight PMMA (Mw≥about 350,000 g/mol), 10-20 minutes was used when applying the first mold to substrate surface.

The temperature used when applying a second mold to a surface of a polymer substrate may be selected from the group consisting of about 60° C. to about 120° C., about 80° C. to about 120° C., about 100° C. to about 120° C., about 60° C. to about 80° C. and about 60° C. to about 100° C.

The pressure used when applying a second mold to a surface of a polymer substrate may be selected from the group consisting of about 10 bars to about 50 bars, about 15 bars to about 50 bars, about 20 bars to about 50 bars, about 25 bars to about 50 bars, about 30 bars to about 50 bars, about 35 bars to about 50 bars, about 40 bars to about 50 bars, about 45 bars to about 50 bars, about 10 bars to about 15 bars, about 10 bars to about 20 bars, about 10 bars to about 25 bars, about 10 bars to about 30 bars, about 10 bars to about 35 bars, about 10 bars to about 40 bars and about 10 bars to about 45 bars.

The time period used when applying a second mold to a surface of a polymer substrate depends on the temperature used in the imprinting step and the depth of imprint required. For example, a lower temperature requires a longer time period while a smaller imprinting depth requires a shorter time period. Exemplary range of time period is from about 10 minutes of about 30 minutes.

The first and subsequent molds may be applied onto a specific region of a surface of a substrate to result in localized hierarchical patterns for which modifications in the wetting properties for that region may be desired.

Different dimensions with different patterns of a first mold and a second mold may be applied to different regions of a surface to result in a surface with a combination of various hierarchical structures leading to different regions of localized wetting properties. This may result in a substrate surface having gradient wetting properties whereby there may be a subsequent or gradual change in the wetting properties along a dimension of the surface.

The method may allow for multidirectional liquid spreading or flow in microfluidic devices due to the primary imprint that may be retained even though a secondary imprint is applied to a surface of a substrate.

BRIEF DESCRIPTION OF DRAWINGS

The accompanying drawings illustrate a disclosed embodiment and serves to explain the principles of the disclosed embodiment. It is to be understood, however, that the drawings are designed for purposes of illustration only, and not as a definition of the limits of the invention.

DETAILED DISCLOSURE OF EMBODIMENTS

Non-limiting embodiments will be further described in greater detail by reference to the following Examples described further below, which should not be construed as in any way limiting the scope of the invention.

Figure 1:
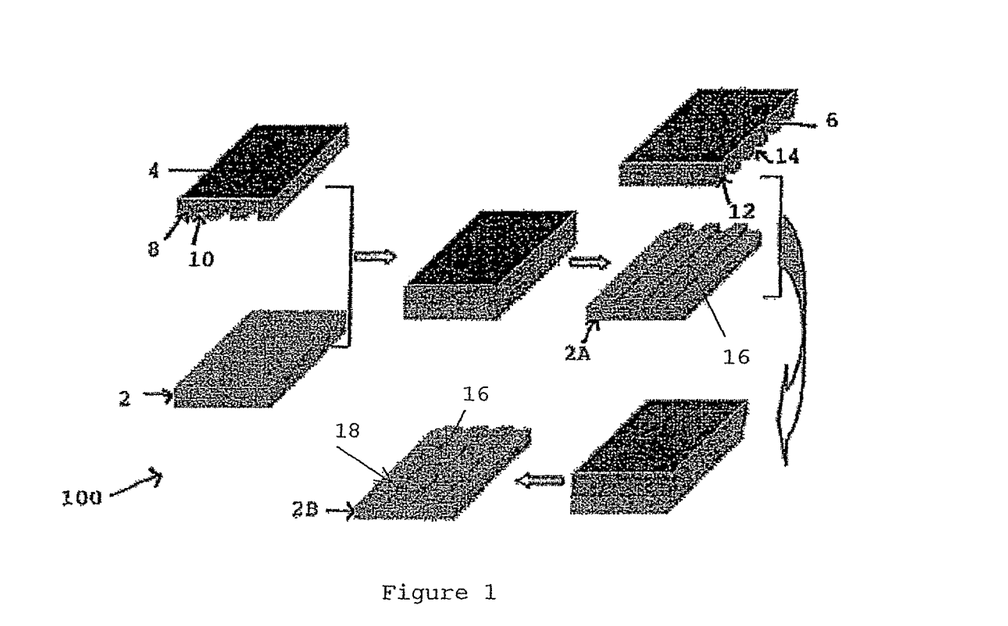
FIG. 1 is a schematic diagram of a method for modifying the wetting properties of a polymer substrate.

FIG. 1 is a schematic diagram of a method 100 according to a disclosed embodiment for modifying the wetting properties of a surface of a polymer substrate 2. The method comprising the steps of applying a first mold 4 to a surface of a polymer substrate 2.

Figure 2:
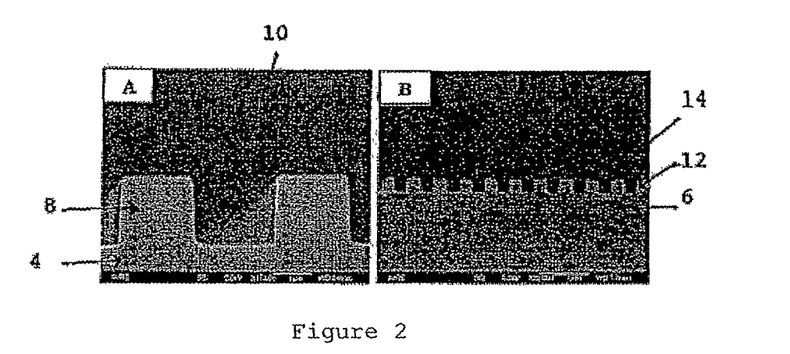
FIG. 2A is a SEM image at 17,000× magnification of a cross-sectional view of a 2 μm grating mold.
FIG. 2B is a SEM image at 22,000× magnification of a cross-sectional view of a 250 nm grating mold.

The mold 4 has a patterned surface consisting of a series of parallel gratings 8 disposed between pairs of trenches 10. The first mold 4 is applied using an Obducat nanoimprinter onto the surface of polymer 2 at a temperature above the $T_g$ of the polymer at a selected pressure and for a selected time to result in a polymer 2A with a three-dimensional primary imprint 16 consisting of the gratings 8 and the trenches 10 of mold 4. FIG. 2A is a SEM image at 17,000× magnification of a cross-sectional view of the first mold 4 consisting of gratings 8 and trenches 10.

A second mold 6 has a pattern of gratings 12 and trenches 14 arranged parallel to each other along the length of the second mold 6. FIG. 2B is a SEM image at 22,000× magnification of a cross-sectional view of the second mold 6 consisting of gratings 12 and trenches 14.

The mold 6 is arranged such that the longitudinal axis of the gratings 12 and trenches 14 is oriented at an "orientation angle" relative to the longitudinal axes of the primary imprint 16. The orientation angle can vary between 0° to 90°. The second mold 6 is applied to the imprint 16 using an Obducat nanoimprinter. In FIG. 1, the orientation angle is 90° relative to the first imprint 16. The second mold 6 is imprinted onto the primary imprint 16 at a temperature below the $T_g$ of the polymer and at a certain pressure and time to result in a polymer 2B with a hierarchical structure consisting of the respective primary and secondary imprints (16,18) as seen from FIG. 1. A three-dimensional secondary imprint complementary to the pattern consisting of gratings 12 and trenches 14 of mold 6 is formed on the surface of polymer 2B.

As will be shown in more detail with respect to the specific examples below, the method 100 results in a polymer substrate 2B having both primary and secondary imprints (16,18) which modify the wetting properties of the original polymer substrate 2.

Polymer Substrate

Referring to FIG. 1, the polymer 2 was made by spin-coating a polymer solution onto a silicon substrate. Following which, the resultant polymer 2 was baked at a certain temperature to remove any residual solvent. The size of the resultant polymer 2 on the silicon substrate was greater than the size of the first mold 4.

It is to be appreciated that the conditions for preparing the polymers are dependent on the thickness required.

Treatment of Molds

Before use, the patterned silicon molds (4 and 6) shown in FIG. 1 are ultra sonicated in an isopropanol, rinsed with acetone and treated with oxygen plasma at 80 W, 250 mTorr for 2 minutes. The molds were subsequently treated with 5 mM perfluorodecyltrichlorosilane (FDTS) in heptane solution for 20 minutes. The surface treatment was performed in a nitrogen/inert gas glove box where the relative humidity was kept low (ie about 15% to about 18%). The molds were then sonicated in heptane solution for 5 minutes to remove physisorbed FDTS, rinsed with acetone and blown dry.

Before imprinting, all the FDTS treated molds (4 and 6) were applied onto the polymer 2 as prepared above at 120° C., 40 bar for 5 minutes to form a "dummy" imprint. This helped to remove any physisorbed silane molecules that escaped sonication so as to eliminate or minimize silane effects that may be passed from the molds (4 or 6) to the polymer 2.

In the examples below, all of the second molds 6 used in the secondary imprinting were subjected to the same treatment prior to each imprinting step so that the second molds 6 are comparable to each other in terms of their exposure to the silane layer. This helped to ensure that any differences in surface wetting properties of hierarchically imprinted polymers were due predominantly to structural effects instead of chemistry effects of silane.

The molds (4 and 6) were cut into suitable sizes to allow for different orientations of the secondary imprint 18 relative to the primary imprint 16. If the orientation angle is 0° or 90°, the first mold 4 and second mold 6 can be of the same size. For example, the size of the first mold 4 and the second mold 6 can be 2 cm by 2 cm. However, if the secondary imprint 18 is to be at an orientation angle of 45° relative to the primary imprint, the second mold 6 should be smaller than the first mold 4 to ensure coverage thereon. For example, a combination of 2 cm by 2 cm for the first mold 4 and 1.3 cm by 1.3 cm for the second mold 6 will work well. The patterned area and mold area of the molds after cutting are exactly the same.

Types of Imprint Surfaces

Figure 3:
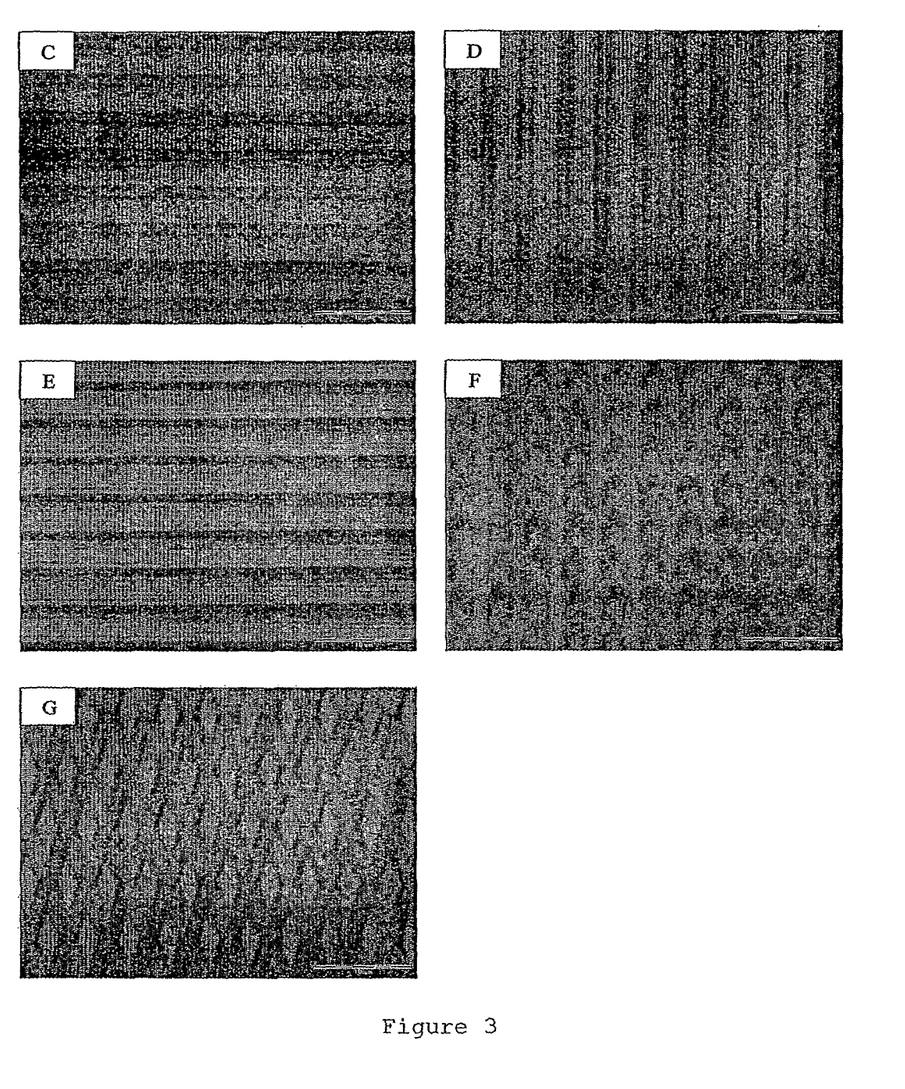
FIGS. 3C to 3G are top view optical microscope images at various magnifications of a polymer with a first imprint and a second imprint at various orientations to the first imprint.
Figure 4:
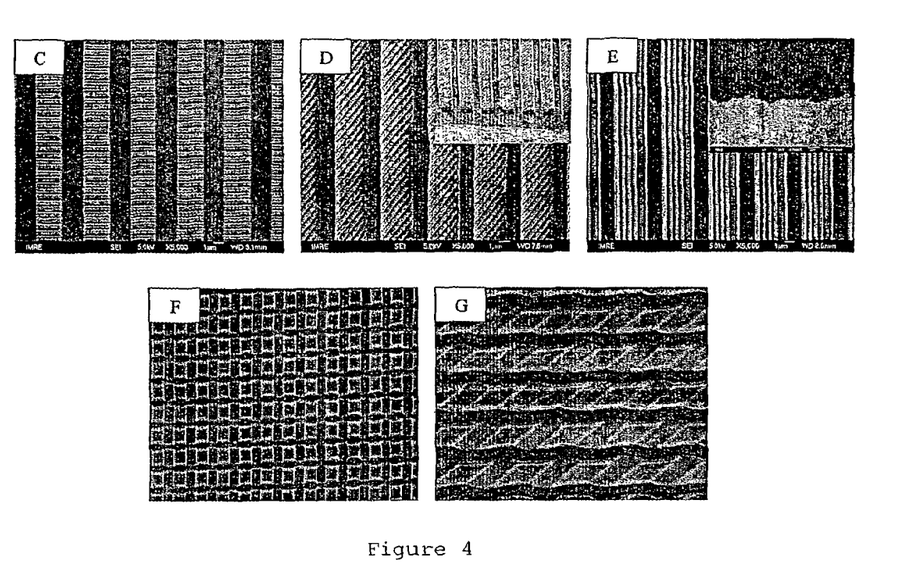
FIGS. 4C to 4G are top SEM images at various magnifications of the corresponding polymer of FIGS. 3C to 3G.

A series of mold surfaces were prepared according to the method 100 shown in FIG. 1 but at different orientation angles. The results of which are shown in FIG. 3 and FIG. 4.

FIGS. 3C to 3G show top view optical microscope images of five types of hierarchical structures on polymers formed in the method 100. It can be seen that these structures show very good pattern yield (nearly 100%) and surface uniformity.

FIG. 3C is a top view optical microscope image at 150× magnification of a polymer made using first mold (4) with a 2 µm width grating and 2 µm width trench to form a primary imprint (16) and second mold (6) with a 250 nm width grating and 250 nm width trench to form a secondary imprint (18) at an orientation angle of 90° to the first imprint (16). This is indicated herein as 2 µm+250 nm.

FIG. 3D is a top view optical microscope image at 150× magnification of a polymer made using first mold (4) with a 2 µm width grating and 2 µm width trench to form a primary imprint (16) and second mold (6) with a 250 nm width grating and 250 nm width trench to form a secondary imprint (18) at an orientation angle of 45° to the first imprint (16). This is indicated herein as 2 µm×250 nm.

, FIG. 3E is a top view optical microscope image at 150× magnification of a polymer made using first mold (4) with a 2 µm width grating and 2 µm width trench to form a primary imprint (16) and second mold (6) with a 250 nm width grating and 250 nm width trench to form a secondary imprint (18) at an orientation angle of 0° to the first imprint (16). This is indicated herein as 2 µm=250 nm.

FIG. 3F is a top view optical microscope image at 150× magnification of a polymer made using first mold (4) with a 2 µm width grating and 2 µm width trench to form a primary imprint (16) and second mold (6) with a 2 µm width grating and 2 µm width trench to form a secondary imprint (18) at an orientation angle of 90° to the first imprint. This is indicated herein as 2 µm+2 µm.

FIG. 3G is a top view optical microscope image at 150× magnification of a polymer made using first mold (4) with a 2 µm width grating and 2 µm width trench to form a primary imprint (16) and second mold (6) with a 2 µm width grating and 2 µm width trench to form a secondary imprint (18) at an orientation angle of 45° to the first imprint. This is indicated herein as 2 µm×2 µm.

FIG. 4 shows top view SEM images at various magnification corresponding tom the polymers of FIG. 3.

FIG. 4C is a top view SEM image at 5,000× magnification of the polymer of FIG. 3C.

FIG. 4D is a top view SEM image at 5,000× magnification of the polymer of FIG. 3D.

FIG. 4E is a top view SEM image at 5,000× magnification of the polymer of FIG. 3E. The insert shows a SEM image at 10,000× magnification of a cross-sectional view of the polymer.

FIG. 4F is a top view SEM image at 4,000× magnification of the polymer of FIG. 3F.

FIG. 4G is a top view SEM image at 4,000× magnification of the polymer of FIG. 3G.

Measurement of Contact Angle

Figure 5:
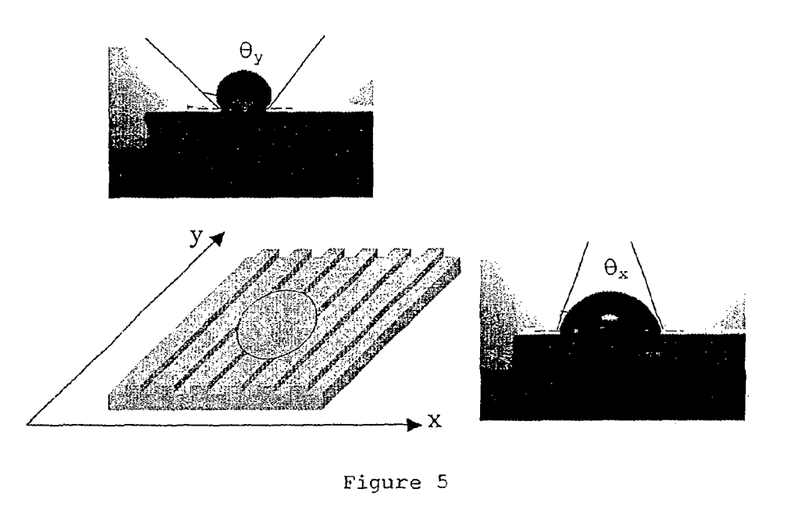
FIG. 5 is a schematic diagram showing measurement of the contact angles in the x- and y-direction of a deionised water droplet on a polymer surface made according to a disclosed embodiment.

FIG. 5 shows a schematic diagram for measuring the contact angles in the X and Y direction of a deionised water droplet on a polymer surface. A ramé-hart digital goniometer from ramé-hart of Mountain Lakes, N.J., United States of America was used to study the surface wetting properties of imprinted polymer films. A small deionised water droplet was first placed gently on the sample surface by an automatic pipette and then a photograph of the water droplet sitting on the polymer surface was taken and analyzed. For each sample, 3 to 6 points were examined. At times, there may be a need to measure the contact angle manually by drawing a tangent on the printout photograph of the water droplet when the goniometer gives unreasonable results due to occasional imperfections on the image of samples.

Silicon Wafer

In all of the Examples below, the silicon wafers are commercially available and have the following properties. The diameter of the wafer is 150+/−0.5 mm; type of dopant is p-boron; orientation 100; resistivity is in the range of 1 to 50 ohm·cm and thickness is about 675+/−25 µm. The wafers are polished on a single side and have semi-standard notches.

Example 1

The method 100 of FIG. 1 was used in this experiment using polymethyl methacrylate (PMMA) as the polymer substrate (2).

PMMA is a hydrophilic material with a water contact angle of about 68°.

Before imprinting, a 15% (by weight) PMMA solution (MW 15,000, Tg 105° C.) obtained from Aldrich of St. Louis, Mo., United States of America in toluene was spun on to well cleaned silicon wafers at 2000 revolution per minute (rpm) for 30 seconds and baked at 150° C. for 5 minutes to remove any residual solvent. The resulting PMMA thin films were about 1.3 μm in thickness based on profilometry scans.

During imprinting, a first mold (4) consisting of gratings (8) of height and width 2 μm (1:1 duty cycle) and trenches (10) of width 2 μm was applied onto the surface of PMMA (2) at 130° C., 40 bars and 10 minutes to form a primary imprint (16) on the surface. Following which, a second mold (6) with gratings (12) and trenches (14) was applied at 90° C., 40 bars for 15 minutes at different orientation angles to form the secondary imprint (18). Here, two types of second molds (6) with different gratings (12) width dimensions of 2 μm and 250 nm respectively were used. These molds were placed at orientation angles of 0° (ie parallel), 45°, and 90° (ie perpendicular).

In this experiment, a total of six PMMA films were used for the following contact angle measurements. Their characteristics are shown in Table 1 below.

TABLE 1

Characteristics of PMMA films

| Film | Primary imprint (16) | Width Dimension of Grating (8) | Secondary imprint (18) | Width Dimension of Grating (12) | Orientation Angle |
|---|---|---|---|---|---|
| A | No | NA | No | NA | NA |
| B | Yes | 2 μm | No | NA | NA |
| C | Yes | 2 μm | Yes | 250 nm | 90° |
| D | Yes | 2 μm | Yes | 250 nm | 45° |
| E | Yes | 2 μm | Yes | 250 nm | 0° |
| F | Yes | 2 μm | Yes | 2 μm | 90° |

A drop of 0.5 μl deionised water droplet was placed gently on the polymer surface by an automatic pipette and a photograph of the water droplet sitting on the polymer surface was taken and analyzed.

Figure 6:
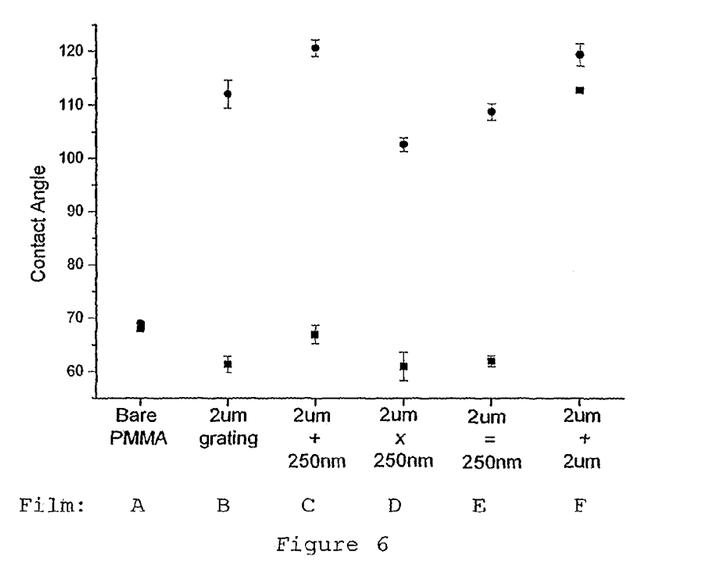
FIG. 6 is a graph showing the contact angles for a number of imprinted polymethyl methacrylate films as described in the examples below.

The values of the contact angles taken from the X and Y direction for each film are presented in Table 2 below and FIG. 6. In FIG. 6, the dark square-shaped symbol "■" indicates that the contact angles were measured in the X direction and the dark circular-shaped symbol "●" indicates that the contact angles were measured in the Y direction.

TABLE 2

Listing of average water contact angles on different PMMA films

| Film | $\theta_x$ (°) | $\theta_y$ (°) | $\Delta\theta = \theta_y - \theta_x$ (°) |
|---|---|---|---|
| A | 68 | 69 | 1 |
| B | 61 ± 2 | 112 ± 3 | 51 |
| C | 67 ± 2 | 121 ± 2 | 54 |
| D | 61 ± 3 | 103 ± 1 | 42 |
| E | 62 ± 1 | 109 ± 2 | 47 |
| F | 113 ± 1 | 119 ± 2 | 6 |

Figure 7:
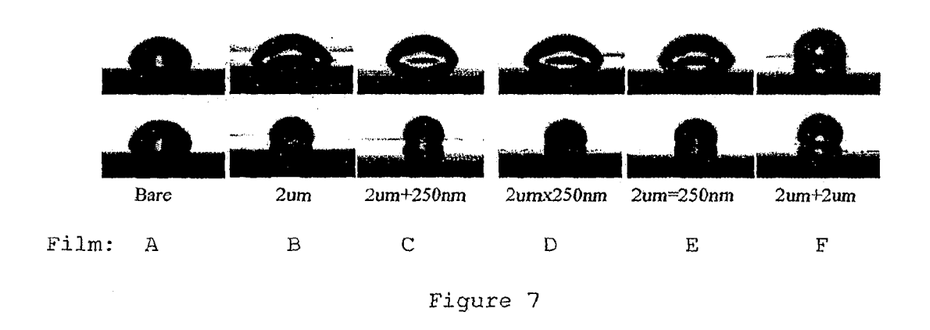
FIG. 7 shows representative photographs of deionised water droplets resting on the polymethyl methacrylate films as described in the examples below.

The representative photographs of water droplets resting on different PMMA films are presented in FIG. 7, whereby the photographs in the top row were obtained in the X direction and the photographs in the bottom row were obtained in the Y direction. These photographs were taken using a camera equipped with the digital goniometer.

Figure 8:
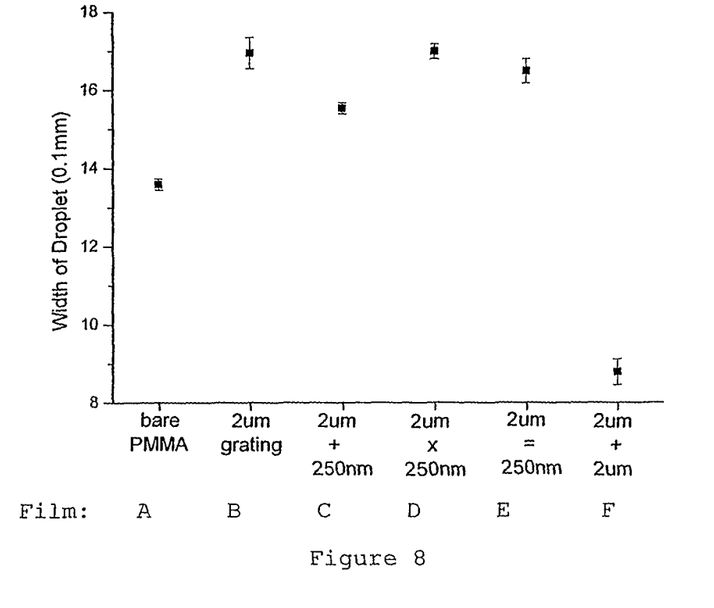
FIG. 8 is a graph showing the width for a number of deionised water droplets.

The width of water droplets for each type of PMMA films are presented in FIG. 8 observed in the X direction. The plus symbol "+" indicates an orientation angle of 90°, the cross symbol "x" indicates an orientation angle of 45°, and the equal symbol "=" indicates an orientation angle of 0°.

It can be seen that without any modifications to the surface of PMMA (ie, film A), the film A exhibits isotropic hydrophilicity with contact angle magnitudes being very close to each other when measured from the X and Y directions. Here, the intrinsic contact angles, θx and θy, are 68° and 69° respectively.

Film B was formed using first mold (4) with gratings of width 2 μm applied onto the surface to form a primary imprint (16). This resulted in a surface with evidently anisotropic wetting behavior of the film, for which θx=61°, θy=112° and Δθ=51°. Such a high anisotropy is due to the energy barriers created by the 2 μm width grating imprint in the X direction. With the energy barriers, water droplets tend to spread or flow along the grooves of the primary imprint grating (16) so that the water droplet acquires an ellipsoid shape with a widened width as seen in FIG. 8.

Film C was formed by applying a second mold (6) with gratings of width 250 nm to the primary imprint (16) at an orientation angle of 90°. Here, both θx and θy increased significantly with an enhancement of the degree of wetting anisotropy (Δθ) to 54°. Film C displayed the greatest change in the contact angles with a significant increase in anisotropy.

Film D was formed by applying a second mold (6) with gratings of width 250 nm to the primary imprint (16) at an orientation angle of 45° while Film E was formed by applying a second mold (6) with gratings of width 250 nm to the primary imprint (16) at an orientation angle of 0°. In both films, the presence of the secondary imprint resulted in a slight decrease in θx and an increase in θy with slightly lower degree of anisotropy (Δθ) of 42° and 47°, respectively as compared to Film C.

Unlike all of the above, when a secondary mold (6) with gratings of width 2 μm was applied to the primary imprint (16) at an orientation angle of 90° to form Film F, this resulted in increases in both θx and θy as compared to Film A. However, the Δθ value is low (about) 6°, indicating a high degree of isotropy.

In comparing Film F to Films C to E, the resultant anisotropic wetting property is a result of the hierarchical structure and dimensions of the second mold (6). As demonstrated, hydrophilic PMMA (Film A) was engineered into a hydrophobic film as seen in Films B to F. However, anisotropic wetting property was only seen in Films B to G.

Therefore, different dimensions of second molds (6) applied at different orientation angles resulted in different magnitudes of contact angle and degree of wetting anisotropy. These differences are closely related to the shape of a water droplet as shown in FIG. 8 wherein the width of water droplets changed with different PMMA surface structures.

Example 2

The method 100 of FIG. 1 was used in this experiment using polystrene (PS) as the polymer substrate (2).

PS is a hydrophobic material with a water contact angle of about 90°.

Before imprinting, a 13% (by weight) PS solution ($M_W$ 280,000, $T_g$ 100° C.) from Aldrich of St. Louis, Mo., United States of America in toluene was spun on to well cleaned silicon wafers at 3000 revolution per minute (rpm) for 40 seconds and baked at 85° C. for 10 minutes to remove any residual solvent. The resulting PS thin films were about 1.7 μm in thickness based on profilometry scans.

During imprinting, a first mold (4) consisting of gratings (8) of height and width 2 μm (1:1 duty cycle) and trenches of width 2 μm width (10) was applied onto the surface of PS (2) at 130° C., 40 bars and 10 minutes to form a primary imprint (16) on the surface. Following which, a second mold (6) with gratings (12) and trenches (14) was applied at 90° C., 40 bars for 15 minutes at different orientation angles to form the secondary imprint (18). Here, two types of second molds (6) with different gratings (12) width dimensions of 2 µm and 250 nm respectively were used. These molds were placed at orientation angles of 0° (ie parallel), 45°, and 90° (ie perpendicular).

In this experiment, a total of seven PS films were used for the following contact angle measurements. Their characteristics are shown in Table 3 below.

TABLE 3

Characteristics of PS films

| Film | Primary imprint (16) | Width Dimension of grating (8) | Secondary imprint (18) | Width Dimension of grating (12) | Orientation angle |
|---|---|---|---|---|---|
| A | No | NA | No | NA | NA |
| B | Yes | 2 µm | No | NA | NA |
| C | Yes | 2 µm | Yes | 250 nm | 90° |
| D | Yes | 2 µm | Yes | 250 nm | 45° |
| E | Yes | 2 µm | Yes | 250 nm | 0° |
| F | Yes | 2 µm | Yes | 2 µm | 90° |
| G | Yes | 2 µm | Yes | 2 µm | 45° |

Optical microscope images and SEM pictures of PS Films C to G are shown in FIG. 3 and FIG. 4 under the same reference alphabet. It is to be appreciated that these structures can be reproducible for other types of polymer substrates.

A drop of 1 µl deionised water droplet was placed gently on the polymer surface by an automatic pipette and a photograph of the water droplet sitting on the polymer surface was taken and analyzed.

Figure 9:
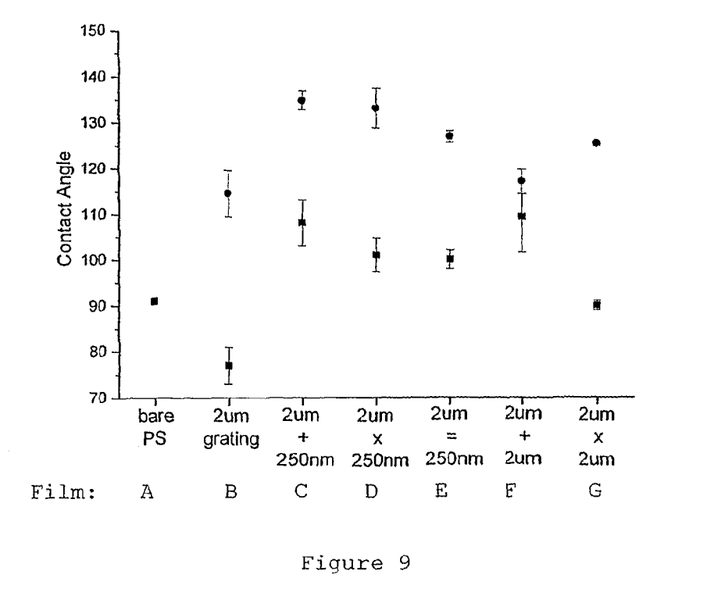
FIG. 9 is a graph showing the contact angles for a number of imprinted polystyrene films as described in the examples below.

The values of the contact angles taken from the x- and y-direction for each film are presented in Table 4 and FIG. 9, where the dark square-shaped symbol "■" indicates that the contact angles were measured in the X direction and the dark circular-shaped symbol "●" indicates that the contact angles were measured in the Y direction.

TABLE 4

Listing of average water contact angles on different PS films

| Film | $\theta_x$ (°) | $\theta_y$ (°) | $\Delta\theta = \theta_y - \theta_x$ (°) |
|---|---|---|---|
| A | 91 | 91 | 0 |
| B | 77 ± 4 | 115 ± 5 | 38 |
| C | 108 ± 5 | 135 ± 2 | 27 |
| D | 101 ± 4 | 133 ± 4 | 32 |
| E | 100 ± 2 | 127 ± 1 | 27 |
| F | 109 ± 8 | 117 ± 3 | 8 |
| G | 90 ± 1 | 125 ± 1 | 35 |

Figure 10:
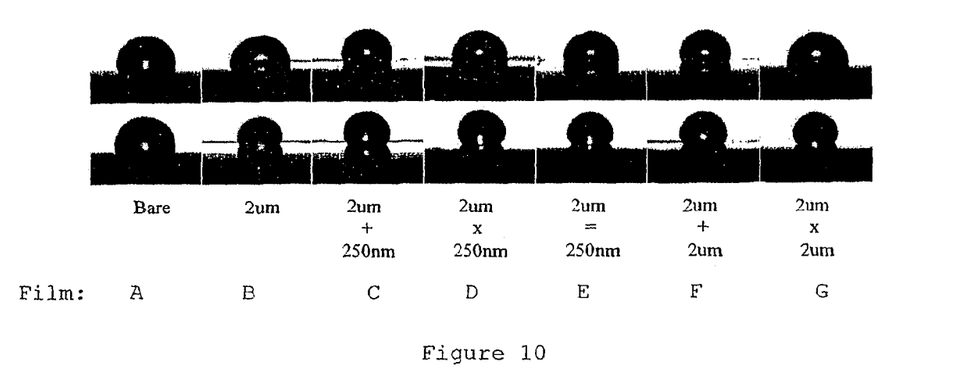
FIG. 10 shows representative photographs of deionised water droplets resting on differently imprinted polystyrene surfaces as described in the examples below.

The representative photographs of water droplets resting on different PS films are presented in FIG. 10 whereby the photographs in the top row were obtained in the X direction and the photographs in the bottom row were obtained in the Y direction. These photographs were taken using the camera equipped with the digital goniometer.

It can be seen that without any modification to the surface of PS (ie, film A), it displays hydrophobic isotropy with contact angle magnitudes being very close to each other when measured from the X and Y directions. Here, both of the intrinsic contact angle values, $\theta_x$ and $\theta_y$, are 91°.

Film B was formed using first mold (4) with gratings of width 2 µm applied onto the surface to form a primary imprint (16). This resulted in a surface with evidently anisotropic wetting behavior of the film, for which $\theta_x$=77°, $\theta_y$=115° and $\Delta\theta$=38°. This corresponded to a widened water droplet.

Films C to E were formed using a second mold (6) with gratings of width 250 nm applied at different orientation angles. Films C to E exhibited enhanced hydrophobicity as seen from the increase in both $\theta_x$ and $\theta_y$ with increased anisotropy as compared to Film A.

Film F was formed using a second mold (6) with gratings of width 2 µm applied at an orientation angle of 90°. Here, there was an increase in both $\theta_x$ and $\theta_y$ as compared to Film A. However, the $\Delta\theta$ value is low (about) 8°, indicating isotropy.

On the other hand, when a second mold (6) with gratings of width 2 µm was applied at an orientation angle of 45° to form Film G, there was an increase in $\theta_y$ only. Therefore, with $\theta_x$ unchanged, there was an increase in the $\Delta\theta$ value (to about 35°), indicating a higher degree in anisotropy as compared to Film A.

While not wishing to be bound by theory, the enhanced hydrophobicity may be a consequence of a higher degree of roughness created by the hierarchical structures and can be understood with the aid of Wenzel model. A reduction in the degree of anisotropy as seen in Film F may be tentatively explained by a combination between roughness effect and energy barrier formations induced by the structure of the grating formations. As seen in FIG. 10, the dimension and/or shape of a water droplet changed to different extents when applied to different films.

Therefore, different three-dimensional hierarchical structures imprinted on polymer substrates have resulted in effective manipulation of dimension and/or shape of water droplets and may result in effective governing of wetting behaviour of the films.

APPLICATIONS

Substrates with modified surface wetting properties can be used in a variety of application including coating and painting of line structured polymer films, liquid droplet-based devices, Micro-Electro-Mechanical Systems (MEMS), Nano-Electro-Mechanical Systems (NEMS), sensors, windows, glass, paints, etc.

Advantageously, the possibility to tune the degree of anisotropy wetting properties of a substrate surface may be applied to various devices in which it is desirable to control the direction of liquid flow. Such devices may include microfluidic devices, lab-on-a chip devices, etc.

Advantageously, the method may be cost effective and may eliminate the need for complicated equipment.

Advantageously, the method may be employed on samples that are on the micro/nanoscale.

Advantageously, the method eliminates the need for chemical treatment of substrate surfaces. Hence, the method may not lead to detrimental changes in the mechanical integrity of the substrate or affect the thermal, optical or chemical properties of the substrate. Furthermore, it is not necessary to use other physical means, such as plasma etching, to alter the wetting properties of the substrate surface.

Advantageously, the method may result in a substrate in which changes to the surface may last longer as compared to other methods to change the surface wetting properties.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

The invention claimed is:

1. A method of modifying the anisotropic wetting properties of the surface of a polymer substrate, the method comprising the steps of:
   (A) applying a first mold having an imprint forming surface including patterns to said polymer substrate at a first temperature to form a first imprint on said polymer substrate;
   (B) applying a second mold having an imprint forming surface including patterns having a smaller dimension than the patterns of said first mold to said first imprint at a second temperature that is different to said first temperature to form a second imprint that is in the same polymer substrate as the first imprint, said second mold configured to vary the size of said first imprint along the height of said first imprint when forming a second imprint on said first imprint which comprises a hierarchical structure; and
   (C) orienting, during said applying step (B), said second mold relative to said first imprint to form said hierarchical structure on said polymer substrate for modifying the wetting properties of the polymer substrate surface.

2. A method according to claim 1, comprising the step of selecting the shapes of said first and second imprints generally longitudinal such that each of said imprints extends about a longitudinal axis.

3. A method according to claim 2, comprising the step of, during said orienting step, applying said second mold to said first imprint such that the longitudinal axes of the formed second imprint are disposed at an angle, relative to the longitudinal axes of the formed first imprint, in the range selected from the group consisting of 0° to 90°, 0° to 45° and 45° to 90°.

4. A method according to claim 3, comprising the step of applying said longitudinal axis of said second mold generally parallel relative to the longitudinal axis of said first imprint.

5. A method according to claim 2, comprising the step of applying said longitudinal axis of said second mold generally perpendicular relative to the longitudinal axis of said first imprint.

6. A method according to claim 1, comprising the step of selecting the width of said first and second imprints in either the microscale or the nanoscale.

7. A method according to claim 1, comprising the step of selecting the width dimension of the patterns of the second imprint forming surface to be smaller than the patterns of the first imprint forming surface.

8. A method according to claim 1, comprising the step of selecting said polymer substrate as a thermoplastic polymer.

9. A method according to claim 1, comprising the step of selecting said polymer substrate as one that comprises an epoxy based negative resist.

10. A method according to claim 1, comprising the step of forming three-dimensional structures during at least one of said first and second applying steps.

11. A method according to claim 10, comprising the step of selecting said three-dimensional structures from at least one of microstructures, nanostructures and combinations thereof.

12. A method according to claim 1, comprising, before at least one of step (A) and step (B), the step of treating at least one of said first and second molds with an anti-stiction agent.

13. A method according to claim 1, comprising the step of forming a defined pattern on the polymer substrate surface which either promotes fluid flow thereon or inhibits fluid flow thereon.

14. A method according to claim 1, comprising, during step (A), the step of selecting a temperature that is above the glass transition temperature (Tg) of said polymer substrate.

15. A method according to claim 1 comprising, during step (B), the step of selecting a temperature that is below the glass transition temperature (Tg) of said polymer substrate.

16. A method according to claim 1, comprising after step (C), forming one or more further imprints on said second imprint in a manner such that said one or more further imprints are at a different orientation to at least said second imprint, wherein the one or more further imprints on said second imprint are in the same polymer substrate as the second imprint.

* * * * *